United States Patent
Francis et al.

(10) Patent No.: US 11,176,472 B2
(45) Date of Patent: Nov. 16, 2021

(54) CHAT DELTA PREDICTION AND COGNITIVE OPPORTUNITY SYSTEM

(71) Applicant: International Business Machines Corporation, Armonk, NY (US)

(72) Inventors: Vijay Francis, Nashua, NH (US); Dennis J. Chen, Wellesley, MA (US); Rogelio Vazquez-Rivera, Acton, MA (US); Jonathan Dunne, Dungarvan (IE); Andrew T. Penrose, Castleknock (IE); Brendan P. Arthurs, Malahide (IE)

(73) Assignee: International Business Machines Corporation, Armonk, NY (US)

( * ) Notice: Subject to any disclaimer, the term of this patent is extended or adjusted under 35 U.S.C. 154(b) by 825 days.

(21) Appl. No.: 15/986,160

(22) Filed: May 22, 2018

(65) Prior Publication Data

US 2019/0362253 A1  Nov. 28, 2019

(51) Int. Cl.
*G06N 5/04* (2006.01)
*H04L 12/58* (2006.01)
*G06F 16/33* (2019.01)

(52) U.S. Cl.
CPC ......... *G06N 5/046* (2013.01); *G06F 16/3346* (2019.01); *H04L 51/04* (2013.01)

(58) Field of Classification Search
CPC ......... H04L 51/04; H04L 51/16; H04L 51/32; G06N 5/046; G06F 16/3346; G06F 16/9536; G06Q 50/01; G06Q 10/10
See application file for complete search history.

(56) References Cited

U.S. PATENT DOCUMENTS

| | | | |
|---|---|---|---|
| 8,683,355 B1 * | 3/2014 | Gailloux | H04L 12/1813 715/758 |
| 9,262,531 B2 * | 2/2016 | Ferren | G06F 16/9535 |
| 9,813,495 B1 | 11/2017 | Van Rensburg et al. | |
| 2006/0282856 A1 | 12/2006 | Errico et al. | |
| 2008/0307038 A1 * | 12/2008 | Nichols | G06Q 10/107 709/203 |
| 2012/0102037 A1 * | 4/2012 | Ozonat | G06F 16/334 707/738 |
| 2012/0143798 A1 * | 6/2012 | Sundelin | H04L 51/12 706/12 |

(Continued)

OTHER PUBLICATIONS

Pupyrev, S., et al., "Analyzing Conversations with Dynamic Graph Visualization", 2010 10th International Conference on Intelligent Systems Design and Applications, Nov. 29-Dec. 1, 2010, pp. 748-753.

(Continued)

*Primary Examiner* — Abdullahi E Salad
(74) *Attorney, Agent, or Firm* — Scully, Scott, Murphy & Presser, P.C.; Kurt P. Goudy, Esq

(57) ABSTRACT

A thread delta prediction and cognitive conversation opportunity generation. A prediction model may be generated based on chat space conversation data, and predicts a chat thread delta associated with a current chat conversation data. A data package may be created based on the chat thread delta. Based on the data package, a conversation opportunity may be determined for a given topic for given user in the chat space, to conduct during a time period of the chat thread delta in real-time.

20 Claims, 7 Drawing Sheets

(56) References Cited

U.S. PATENT DOCUMENTS

| | | | |
|---|---|---|---|
| 2015/0256636 A1 | 9/2015 | Spivack et al. | |
| 2016/0026962 A1 | 1/2016 | Shankar et al. | |
| 2016/0150041 A1* | 5/2016 | Bolinger | H04L 67/14 |
| | | | 706/12 |
| 2016/0321283 A1* | 11/2016 | Shen | G06Q 10/06313 |
| 2016/0379129 A1 | 12/2016 | Assem Aly Salama et al. | |
| 2018/0024994 A1* | 1/2018 | Sarikaya | G06F 40/40 |
| | | | 704/9 |
| 2018/0091654 A1* | 3/2018 | Miller | G06Q 50/2057 |
| 2018/0218728 A1* | 8/2018 | Manuvinakurike | G10L 15/063 |
| 2019/0089829 A1* | 3/2019 | Nicholls | H04W 64/006 |
| 2019/0205743 A1* | 7/2019 | Jiang | G06N 3/08 |
| 2019/0318730 A1* | 10/2019 | Hazarika | G10L 15/22 |

OTHER PUBLICATIONS

Suthers, D., et al., "Exposing Chat Features Through Analysis of Uptake Between Contributions," 2012 45th Hawaii International Conference on System Sciences, Jan. 4-7, 2012, pp. 3368-3377.

Badea, I., et al., "CSCL chats Analysis using R package," Proceedings of the 18th International Conference on System Theory, Control and Computing, Oct. 17-19, 2014, pp. 879-884.

Boudebza, S., et al., "Ontology-Based Approach for Temporal Semantic Modelling of Social Networks," 2015 3rd International Conference on Future Internet of Things and Cloud, Aug. 24-26, 2015, pp. 736-741.

* cited by examiner

Thread Delta – Fitted Model

```
Coefficients:
                          Estimate Std. Error t value Pr(>|t|)
(Intercept)              -0.1558146  0.4343201  -0.359  0.72003
Thread.Duration           0.0040350  0.0002342  17.230  < 2e-16 ***
Total.Users.per.thread    0.6572590  0.1652718   3.977  8.73e-05 ***
Total.Words.per.thread    0.0023500  0.0007396   3.177  0.00164 **
entities_relevance1       2.0134595  0.4723361   4.263  2.70e-05 ***
entities_relevance3       1.6437519  0.5813715   2.827  0.00500 **
keywords_relevance3       2.3324482  0.5809171   4.015  7.49e-05 ***
emotion_disgust_relevance -3.2619120  1.8616734  -1.752  0.08076 .
---
Signif. codes:  0 '***' 0.001 '**' 0.01 '*' 0.05 '.' 0.1 ' ' 1

Residual standard error: 2.453 on 304 degrees of freedom
Multiple R-squared:  0.7287,    Adjusted R-squared:  0.7224
F-statistic: 116.6 on 7 and 304 DF,  p-value: < 2.2e-16
```

FIG. 3

CHAT DELTA PREDICTION AND COGNITIVE OPPORTUNITY SYSTEM

BACKGROUND

The present application relates generally to computers and computer applications, and more particularly to electronic conversation and messaging systems such as instant messaging systems.

With the growing popularity of chat messaging systems (including pervasive chat systems) there is a need to use data generated from chat traffic to provide a grander user experience. One of the challenges practitioners face is in the area of determining with a high degree of precision, the boundaries between chat threads. For example, the ability to predict this duration with a high degree of precision would allow a cognitive system to be used to suggest or recommend additional collaboration opportunities. Therefore, there is a need for a system that can first predict chat deltas with a high degree of precision, then using this information a cognitive recommendation system to suggest collaboration and/or social opportunities.

BRIEF SUMMARY

A method and system may be provided, which may predict chat thread delta, a time between chat threads, and provide conversation opportunity in a chat space. The method, in one aspect, may include receiving chat space conversation data associated with a chat space. The method may also include selecting features associated with the chat space conversation data. The method may further include extracting feature values associated with the features from the chat space conversation data. The method may further include generating a prediction model based on the features and associated feature values, the prediction model predicting a chat thread delta associated with the chat space. The method may also include creating a data package based on the chat thread delta. The method may further include, based on the data package, determining a conversation opportunity for a given topic for a given user in the chat space, to conduct during a period or duration of the chat thread delta in real-time.

A system of predicting chat thread delta in a chat space and providing conversation opportunity, in one aspect, may include at least one hardware processor and a memory device coupled to the at least one hardware processor. The at least one hardware processor may be operable to at least: receive chat space conversation data associated with a chat space; select features associated with the chat space conversation data; extract feature values associated with the features from the chat space conversation data; generate a prediction model based on the features and associated feature values, the prediction model predicting a chat thread delta associated with the chat space; create a data package based on the chat thread delta; and based on the data package, determine a conversation opportunity for a given topic for a given user in the chat space, to conduct during a duration of the chat thread delta in real-time.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 3 shows a sample table of derived estimates using regression modeling in one embodiment.

DETAILED DESCRIPTION

A system, method and techniques may be provided that can determine or predict the duration between chat conversations within a chat space, for example, with a degree of precision. A cognitive system may be also provided that may use such information to provide collaboration and/or social opportunities, for example, within a chat session or chat space, for example, creating additional collaboration opportunities during conversation downtimes. For instance, a collaboration recommendation system may be provided that is cognizant of a user's free time (relative to the user's chat space or channel) and the user's prior social footprint. A chat space herein refers to a real-time online space, (for example, also referred to as a chat room), where users communicate, for example, send text messages, and/or interact online, synchronously or asynchronously. A chat space stores all messages posted in that chat space in a persistent store (e.g., memory or storage device), hence a chat space also acts as a persistent store or container of all messages in a chat space. Each chat space may be identified by a unique identifier (ID).

Figure 1:
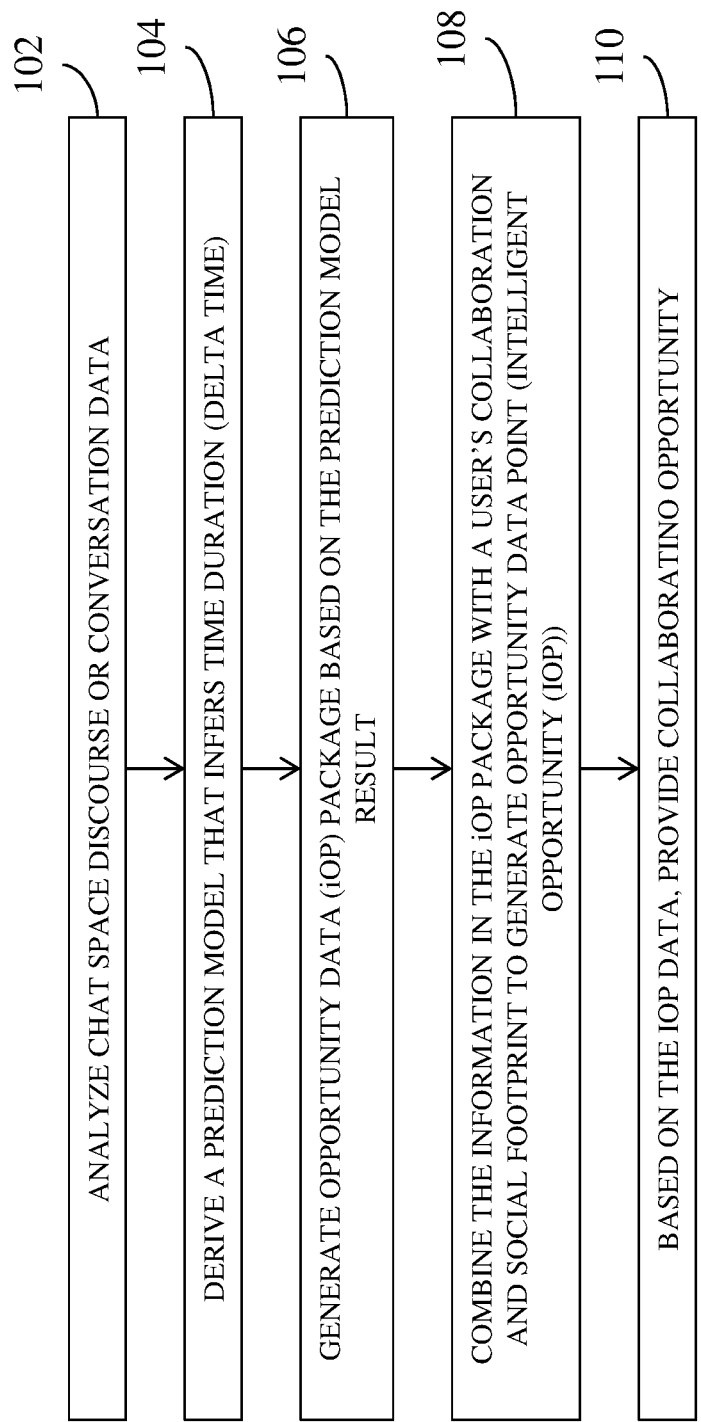
FIG. 1 is a flow diagram illustrating a method of determining chat delta and providing collaboration opportunity in one embodiment.

FIG. 1 is a flow diagram illustrating a method of determining chat delta and providing collaboration opportunity in one embodiment. The method may be executed on at least one hardware processor, for example, a chat messaging application or system running on at least one hardware processor, providing a user interface and communication capabilities for conducting online messaging in real-time.

At 102, chat space discourse or conversation data is analyzed. For instance, conversation data, which may include text data of the chat messages, may be analyzed to discover the underlying topics or themes. For example, topic analysis may be performed on interleaved messages, which are exchanged in a chat space, e.g., of a chat messaging system or the like, to identify a subset of messages that form part of a common conversation relating to a particular topic or theme over a period of time. Such analysis may also discover chat threads in the real-time chat space. A chat thread herein refers to an independent conversation, a homogeneous set of messages or communication that relates to one or more topics. A chat space may include multiple chat threads. According to some embodiments, a method of the present disclosure may determine or identify one or more chat threads by implementing and executing topic modeling, text mining, and/or another information recognition technique, which may include calling out words and phrases in a chat. For instance, topic modeling may be used to discover the underlying topics in the set of messages in a chat space, each topic having a representative set of keywords referred to as "topic terms" that form a "topic bundle". Maximum likelihood estimation (MLE) may be used to determine the likelihood of keywords being present in a topic bundle (known as "relevancy" or "relevance"). A predefined number of topics may be identified based on the MLE scores. An example method for such topic discovery is Latent Dirichlet Allocation (LDA) topic modeling for maximum likelihood fit. In some embodiments, one or more methods described in U.S. patent application Ser. No. 15/598,375 filed on May 18, 2017, entitled "Improved Data Clustering" may be implemented to analyze the conversation data in a chat space. That application is incorporated herein by reference in its entirety.

Such topic modeling may discover keywords or topic terms in chat threads occurring in a chat space. In some aspects, the analysis of the conversation data further identifies or determines factors such as chat thread duration, number of users participating in a chat thread, for example, total users per thread, number of words used in a chat thread, for example, total words per thread, relevant types of words or class of words (e.g., entities), relevant keywords (e.g., terms) used in a chat thread.

Figure 2:
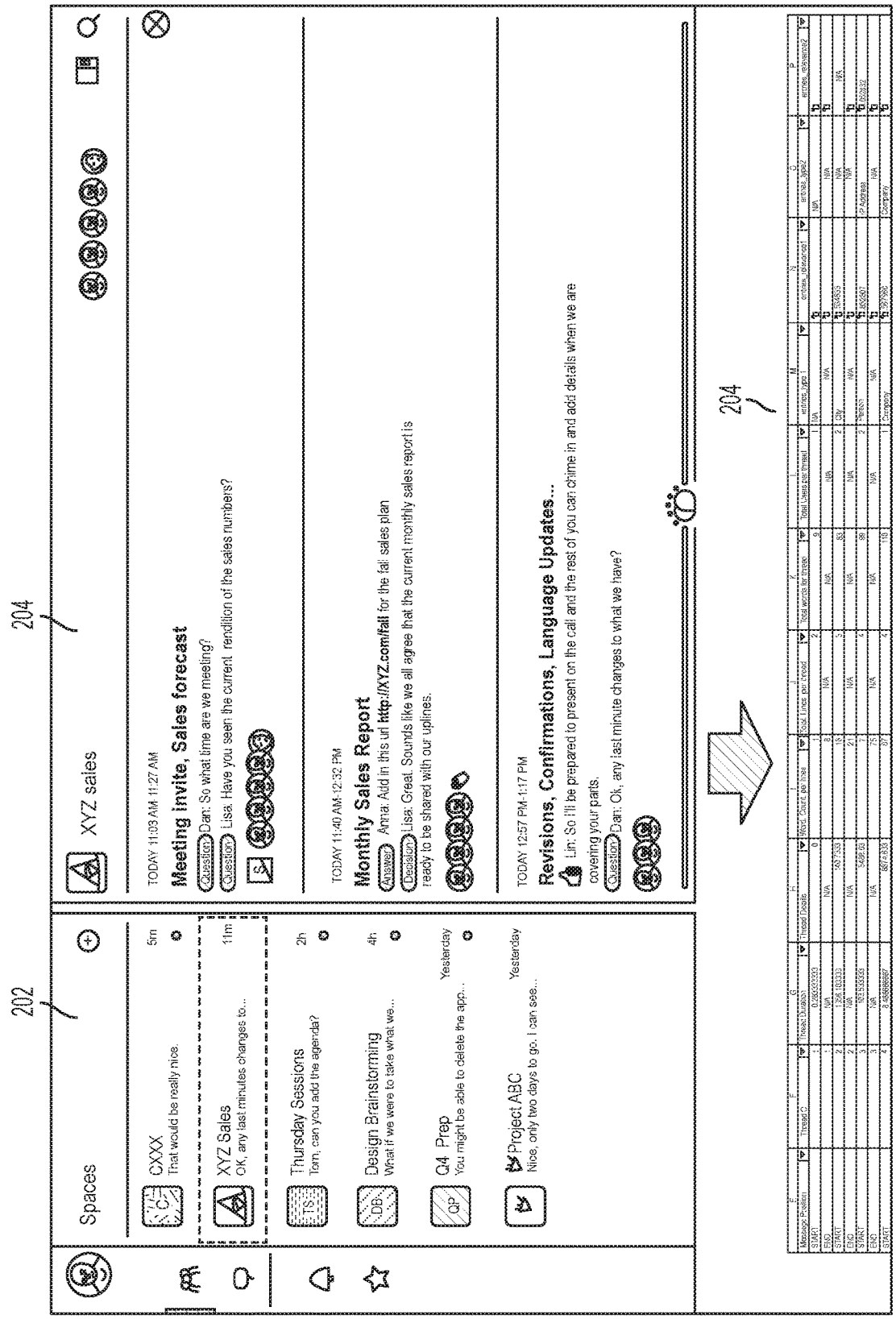
FIG. 2 illustrates an example chat space and analyzing the conversation data in the chat space in one embodiment.

FIG. 2 illustrates an example chat space and analyzing the conversation data in the chat space in one embodiment. The user interface shown in FIG. 2 illustrates multiple chat spaces in which a user may be participating, for example, at 202. Multiple chat threads are shown at 204, which are contained in a chat space identified by "XYZ Sales". In some embodiments, data is extracted in real-time from the chat space and an analysis of the data may create information shown at 206.

Referring back to FIG. 1, at 104, from the analysis at 102, a prediction model is derived, for instance, that infers the time until the next chat thread. In some embodiments, the prediction model is generated on a per space basis. For example, a prediction model may be built based on analyzing chat data (e.g., chat conversation data) stored associated with a respective chat space. For instance, based on the analyzed chat conversation data, a regression model may be generated. A prediction model that is generated need not be limited to a regression model only; rather another prediction model may be generated based on the chat data. FIG. 3 shows a sample table of derived estimates using regression modeling in one embodiment. For example, the regression modeling in some embodiments fits the analyzed data with independent variables that may include thread duration, total users per thread, total words per thread, entity relevance, keyword relevance, and emotion relevance, and estimates coefficient values associated with the independent variables. Thread delta (also referred to as chat thread delta) represents the time until the next chat thread, e.g., idle time (no conversational interaction) between chat threads in a chat space. For example, according to the sample table shown in FIG. 3, the fitted model is:
Thread.Delta=−0.1558146+0.0040350*(Thread.Duration)+ 0.6572590*(Total.Users.per.thread)+0.0023500*(Total. Words.per.thread)+2.0134595*(entities_relevance1)+ 1.6437519*(entities_relevance3)+2.3324482*(keywords_ relevance3)−3.2619120*(emotion_relevance)

The above example regression model models feature variables such as thread duration, total users per thread, total words per thread, entity relevance, keyword relevance, and emotion relevance for predicting thread delta. Techniques such as principal component analysis (PCA) may be implemented and executed with chat conversation data as input to automatically select features considered to be statistically important in a chat space. Hence, a predictive model that is built to predict thread delta may model different features based particular chat space data. Moreover, the weight values associated with the features may be updated, for example, periodically based on additional conversation data occurring in the chat space. In addition, the factors or features may also change (e.g., addition of different feature and/or deletion of a feature previously modeled), based on additional conversation data occurring in the chat space.

Using a built regression model, for example, the above fitted prediction model, a chat thread delta may be derived by plugging in observed data associated with the coefficients (multiplying the estimated coefficients with corresponding independent variables) and adding the data with the intercept value.

Figure 4:
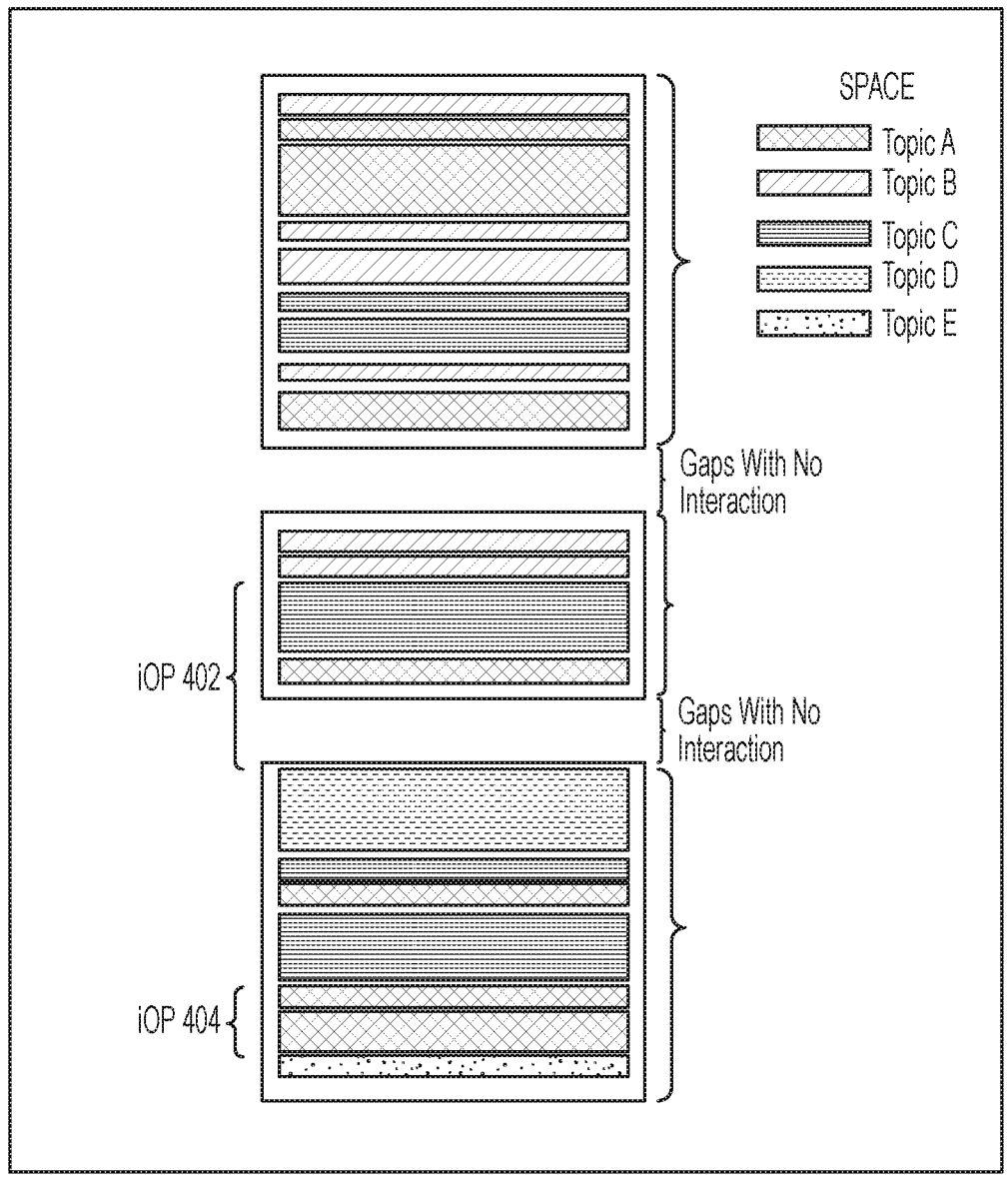
FIG. 4 shows time data associated with topics in a chat space in one embodiment.

FIG. 4 shows time data associated with topics in a chat space in one embodiment. The topics in the chat space are interleaved with time gaps of no interaction on any topics. In some embodiments, it is after a conversation about a topic has ended that the analysis provides the iOP in each case.

Referring to FIG. 1, at 106, an intelligent opportunity (iOP) data package is generated, from which an opportunity data point (also referred to as intelligent opportunity (iOP) may be generated. For example, a data structure package may be generated that includes the identifier of a chat space, a topic or chat thread identified in the conversation discussed or communicated in the chat space, entities or items discussed in the conversation, keywords (words) used in the conversation, sentiment of the participants during the conversation, identities of the participants in the conversation (e.g., users), and start time and end time for a collaboration or discussion opportunity in the chat space (e.g., thread delta predicted by the regression or another prediction model generated above). The time data (e.g., thread delta) may be correlated with a topic (e.g., determined by topic mining) in the chat space, which has the highest probably of being discussed in the chat space again given the available thread delta time.

The following is an example iOP package generated at 106, and sent from the chat space to the iOP engine.

```
{
  "space": "All About Widgets"
  "topic": "A",
  "entities": "bank, bank executives",
  "keywords": "money, loans",
  "sentiment": "neutral, sad",
  "members": [ "User A", "User B", "User J" ],
  "iop_start_time": "10/02/2017 10:51",
  "iop_end_time": "10/02/2017 11:21"
}
``` iOPs from the chat space may be processed in an iOP engine (e.g., a hardware processor), which takes in various inputs and allows for opportunities to be identified with the space. FIG. 4 shows time data associated with topics discussed in a chat space in one embodiment. The example chat space for example includes conversations related to topics A, B, C, D, E. The figure also shows that there are time gaps that occurred after a discussion related to Topic A. An example iOP 402 may be generated associated with topic C and topic A, and an example iOP 404 may be generated associated with topic A, for example, based on the conversation data occurring in the chat space.

Referring back to FIG. 1, at 108, the time data (e.g., thread delta) inferred by the prediction model may be combined with a user's collaboration and social footprint. For instance, social media platform information associated with the users participating in the chat space, for example, a chat thread in the chat space, may be accessed and retrieved to obtain data associated with the users. Such data may contain information such as when (e.g., time) the one or more users are available, what devices the users may use in conducting a chat, skill set associated with the one or more users, and other information. Such data may be used with the time data inferred by the prediction model to provide collaboration opportunities during the time data inferred by the prediction model.

At 110, the iOP data is surfaced with a collaboration and social façade to guide a user to additional collaboration opportunities. For example, an opportunity is created by the iOP engine by processing the iOP package data in real time, using member information from sources such as electronic calendars and social media. For example, a user's electronic calendar may be accessed to determine the user's available times, for example, to be able to recommend to the user a further chatting or collaboration opportunity during the delta time (thread delta) associated with the topic specified in the iOP package. Similarly, a user's online social network site or page (e.g., web site or web page) or social network data may be accessed, for example, via an application programming interface (API) which may be provided by the associated online social network application, or for example, by screen scraping, to determine additional information associated with the user in order to determine whether to recommend to the user a further chatting or collaboration opportunity during the delta time in the chat space. In some aspects, an electronic calendar API may be invoked to create a calendar invitation for the chatting or collaboration opportunity, for example, during the delta time (e.g., the start and end time specified in the iOP package). Yet in some aspects, a messaging API may be invoked to send a message to a user notifying the user of the chatting or collaboration opportunity. Yet in some aspects, the results of the iOP engine, e.g., identified opportunities may be presented (e.g., displayed) via a user interface to the user.

Examples of an opportunity may include, but are not limited to, a collaboration opportunity to share a conversation in another channel, for example, via microservices architecture; an opportunity to share social media data relevant to a topic; an opportunity to get in contact with an expert related to a topic; an opportunity to mentor less experienced contributors to a chat thread. For example, microservices may be running in parallel as a pipeline, each of the microservices functioning as a stage in the pipeline, and may be executed via a hypertext transfer protocol (HTTP) invocation.

Figure 5:
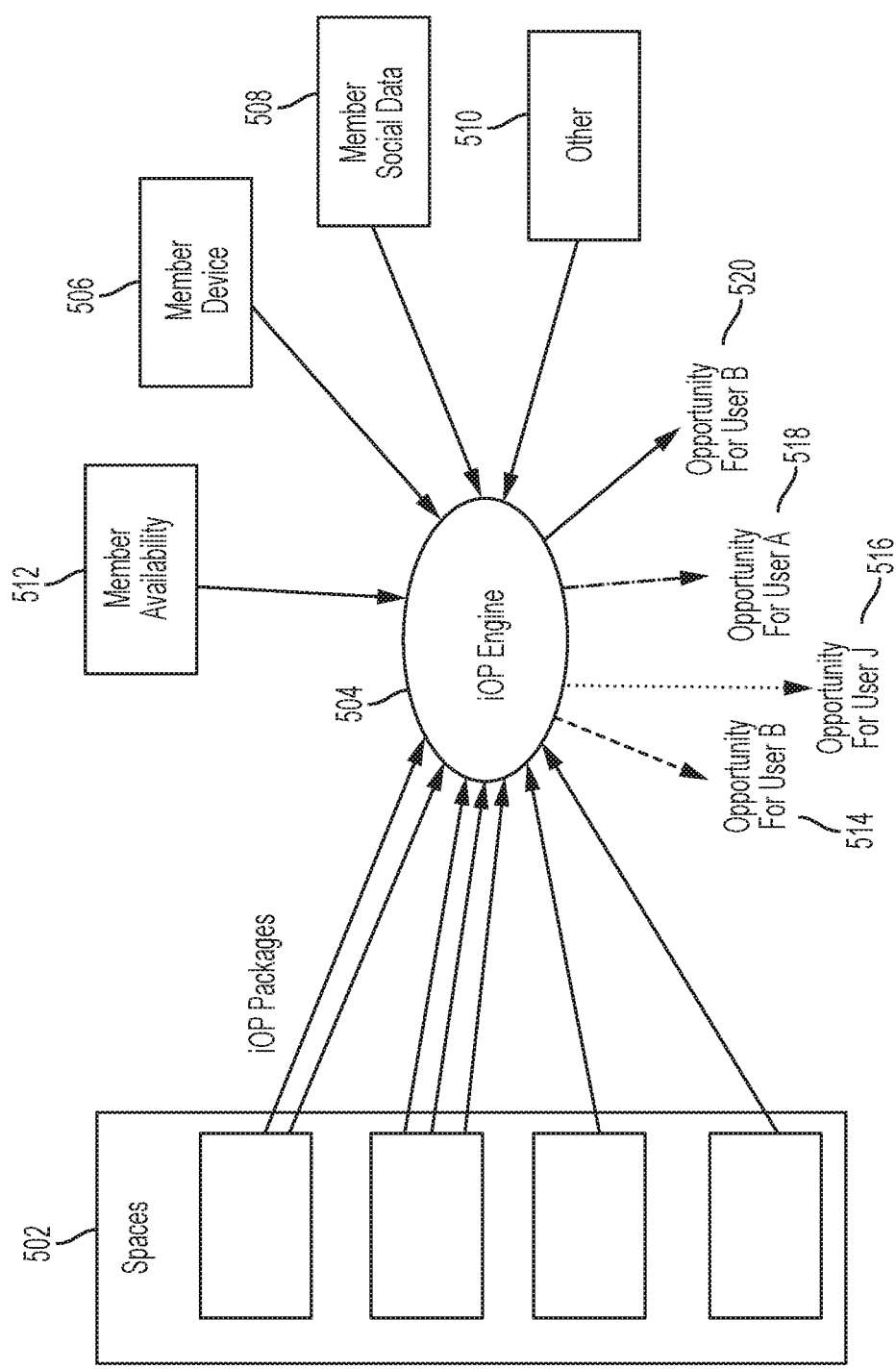
FIG. 5 is a diagram illustrating an iOP engine in one embodiment.

FIG. 5 is a diagram illustrating an iOP engine in one embodiment. The iOP engine 504 may receive from one or more chat spaces 502 one or more iOP packages associated with the corresponding chat space 502. The iOP engine may extract data associated with one or more members specified in an iOP package and create a collaboration opportunity for one or more members (users) based on the data in the iOP package and the extracted data. For instance, member availability data 512 may be extracted from the member's electronic calendar or another application; one or more types of devices 506 a member uses in communicating, for example, a smartphone, laptop, personal computer, tablet, and/or another device; the member's social data, for example, from the member's social network (e.g., online social network platform) 508, and/or another data 510.

As described above, based on the information contained in an iOP package and the information contained in the data extracted from the above-specified sources, the iOP engine 504 may create one or more opportunities for a user, for example, opportunity for user B 514, opportunity for user J 516, opportunity for user A 518, another opportunity for user B 520.

In some embodiments, prediction models generated for previous spaces are stored and validated against each additional space, which may avoid the need to derive a fresh model for each space, and thus providing efficiency in computer functionality by reducing the expending of computational power. Responsive to determining that the previously derived prediction model or models lack precision in the additional chat space, the previously derived prediction model or models may be revised and stored as a new distinct model. In some embodiments, a domain specific model may be implemented, for example, specific to domains such as pharmaceutical domain, financial technology (e.g., fintech) domain, and/or another domain, which can be used for precise opportunities.

In some embodiments, an iOP engine can contain a feedback loop, which prioritizes opportunities presented based on historical analysis of actions taken from previously presented opportunities. The feedback loop can be calibrated against moving average verse auto regressive techniques for close or distant opportunities. For instance, a user may input as feedback whether an opportunity created for that user was useful and/or effective. Based on the user's feedback, the prediction method that identifies the opportunities may correct itself, so that the next time the prediction is more accurate.

Figure 6:
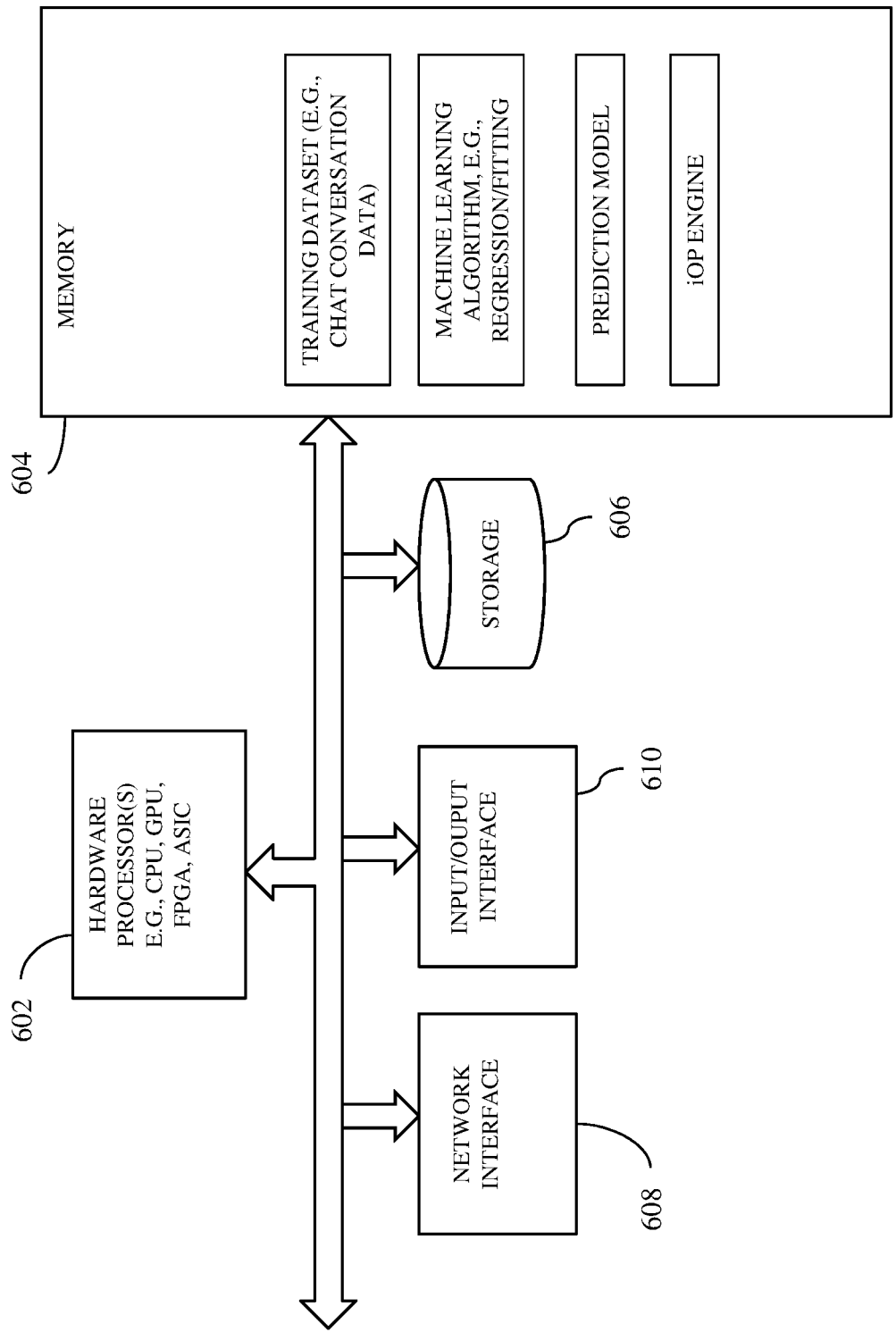
FIG. 6 is a diagram showing components of a system in one embodiment that determines chat delta and provides a cognitive tool that can recommend real-time communication suggestions.

FIG. 6 is a diagram showing components of a system in one embodiment that determines chat delta and provides a cognitive tool that can recommend real-time communication opportunities during the time of the chat delta in a chat space. One or more hardware processors 602 such as a central processing unit (CPU), a graphic process unit (GPU), and/or a Field Programmable Gate Array (FPGA), and/or an application specific integrated circuit (ASIC), and/or another processor, may be coupled with a memory device 604, and generate a prediction model and recommend communication opportunities. The memory device 404 may, for example, store instructions and/or data for functioning of the one or more hardware processors 602, and may include an operating system and other program of instructions and/or data. The one or more hardware processors 602 may receive input comprising chat space conversation data. For instance, at least one hardware processor 602 may generate a prediction model that predicts chat thread delta, e.g., using a regression technique or another technique. In one aspect, such chat space conversation data may be stored in a storage device 606 or received via a network interface 608 from a remote device, and may be temporarily loaded into the memory device 604 for building or generating the prediction model. The learned prediction model may be stored on memory 604, for example, for execution by one or more hardware processors 602. The one or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
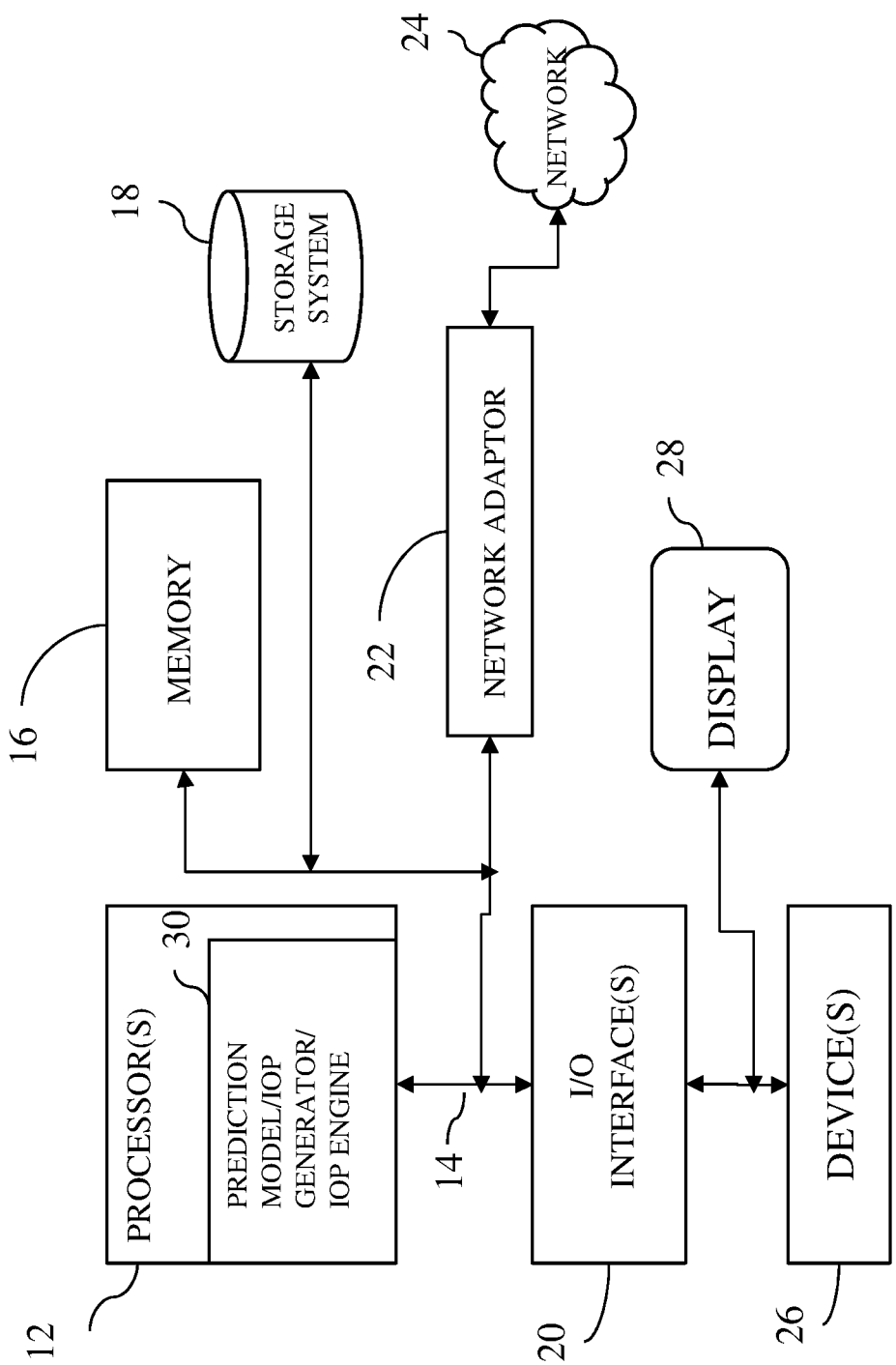
FIG. 7 illustrates a schematic of an example computer or processing system that may implement a system in one embodiment.

FIG. 7 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method executed by at least one hardware processor, comprising:
    receiving chat space conversation data associated with a chat space;
    selecting features associated with the chat space conversation data;
    extracting feature values associated with the features from the chat space conversation data;
    generating a prediction model based on the features and associated feature values, the prediction model predicting a chat thread delta representing idle time until a next chat thread associated with the chat space;
    creating a data package based on the chat thread delta; and
    based on the data package, determining a conversation opportunity for a given topic for a given user in the chat space, to conduct during a time period of the chat thread delta in real-time.

2. The method of claim 1, wherein the data package comprises a chat space identifier, a topic identifier, entities, keywords, sentiment, members, start time of the conversation opportunity and end time of the conversation opportunity.

3. The method of claim 2, further comprising extracting user data associated with one or more members from at least one of: social media data associated with the one or more users and electronic calendar data associated with the one or more users, and based on information from the data package and the extracted user data, determining the conversation opportunity.

4. The method of claim 1, further comprising invoking a microservice to share the conversation opportunity in another channel.

5. The method of claim 1, further comprising receiving a feedback associated with the conversation opportunity, and regenerating the prediction model based on the feedback.

6. The method of claim 1, wherein the features comprise a chat thread duration, total users per the chat thread, total words per the chat thread, entity relevance, keyword relevance, and emotion relevance.

7. The method of claim 1, wherein the features change based on an on-going conversation occurring in the chat space.

8. The method of claim 1, further comprising re-generating the prediction model based on additional chat space conversation data associated with an on-going conversation occurring in the chat space.

9. The method of claim 1, wherein the prediction model is generated for a specific domain.

10. The method of claim 1, wherein the prediction model comprises a regression model.

11. A computer readable storage medium storing a program of instructions executable by a machine to perform a method comprising:
receiving chat space conversation data associated with a chat space;
selecting features associated with the chat space conversation data;
extracting feature values associated with the features from the chat space conversation data;
generating a prediction model based on the features and associated feature values, the prediction model predicting a chat thread delta representing idle time until a next chat thread associated with the chat space;
creating a data package based on the chat thread delta; and
based on the data package, determining a conversation opportunity for a given topic for a given user in the chat space, to conduct during a time period of the chat thread delta in real-time.

12. The computer readable storage medium of claim 11, wherein the data package comprises a chat space identifier, a topic identifier, entities, keywords, sentiment, members, start time of the conversation opportunity and end time of the conversation opportunity.

13. The computer readable storage medium of claim 12, further comprising extracting user data associated with one or more members from at least one of: social media data associated with the one or more users and electronic calendar data associated with the one or more users, and based on information from the data package and the extracted user data, determining the conversation opportunity.

14. The computer readable storage medium of claim 11, further comprising invoking a microservice to share the conversation opportunity in another channel.

15. The computer readable storage medium of claim 11, further comprising receiving a feedback associated with the conversation opportunity, and regenerating the prediction model based on the feedback.

16. The computer readable storage medium of claim 11, wherein the features comprise a chat thread duration, total users per the chat thread, total words per the chat thread, entity relevance, keyword relevance, and emotion relevance.

17. The computer readable storage medium of claim 11, wherein the features change based on an on-going conversation occurring in the chat space.

18. A system of predicting chat thread delta in a chat space, comprising:
at least one hardware processor;
a memory device coupled to the at least one hardware processor;
the at least one hardware processor operable to at least:
receive chat space conversation data associated with a chat space;
select features associated with the chat space conversation data;
extract feature values associated with the features from the chat space conversation data;
generate a prediction model based on the features and associated feature values, the prediction model predicting a chat thread delta representing idle time until a next chat thread associated with the chat space;
create a data package based on the chat thread delta; and
based on the data package, determine a conversation opportunity for a given topic for a given user in the chat space, to conduct during a time period of the chat thread delta in real-time.

19. The system of claim 18, wherein the data package comprises a chat space identifier, a topic identifier, entities, keywords, sentiment, members, start time of the conversation opportunity and end time of the conversation opportunity.

20. The system of claim 19, wherein the at least one hardware processor is further operable to extract user data associated with one or more members from at least one of: social media data associated with the one or more users and electronic calendar data associated with the one or more users, and based on information from the data package and the extracted user data, determine the conversation opportunity.

* * * * *